United States Patent [19]

Rasmussen

[11] Patent Number: 4,765,911
[45] Date of Patent: Aug. 23, 1988

[54] PROCESS FOR TREATING MUNICIPAL WASTEWATER SLUDGE

[75] Inventor: Hans W. Rasmussen, St. George, Utah

[73] Assignee: North American Metals, Inc., Las Vegas, Nev.

[21] Appl. No.: 95,860

[22] Filed: Sep. 14, 1987

[51] Int. Cl.[4] .............................................. C02F 11/14
[52] U.S. Cl. .................................. 210/710; 210/721; 210/725; 210/727; 71/12
[58] Field of Search ............... 210/609, 710, 711, 714, 210/716, 721, 722, 724–728, 734, 751, 757, 758; 71/12, 13

[56] References Cited

U.S. PATENT DOCUMENTS

| | | | |
|---|---|---|---|
| 1,511,418 | 10/1924 | MacLachlan | 210/724 |
| 4,038,180 | 7/1977 | Talbert | 210/711 |
| 4,053,394 | 10/1977 | Fisk | 210/609 X |
| 4,224,148 | 9/1980 | Lindman et al. | 210/714 |
| 4,267,058 | 5/1981 | Kyri et al. | 210/716 |
| 4,340,489 | 7/1982 | Adams et al. | 210/721 X |
| 4,600,513 | 7/1986 | Mizutani et al. | 210/725 X |
| 4,671,882 | 6/1987 | Douglas et al. | 210/721 X |

Primary Examiner—Tom Wyse
Attorney, Agent, or Firm—Seiler, Quirk & Tratos

[57] ABSTRACT

An improved process for treating aerobic or anaerobic sewage sludge comprises a two-stage treatment with sulfur dioxides. In the first stage, between 25 and 40 pounds of sulfur dioxide per ton of dry sludge solids as reacted to optimize solids separation while substantially reducing coliform counts to acceptable environmental protection limits. Solids are separated and water discharged. Recovered solids are then treated with between 300–500 pounds of sulfur dioxide per dry solids ton to solubilize heavy, toxic and noble metals which may be recovered from the liquor. Separated sludge solids form a desirable and hazardous metal-free fertilizer.

13 Claims, 2 Drawing Sheets

PROCESS FOR TREATING MUNICIPAL WASTEWATER SLUDGE

BACKGROUND OF THE INVENTION

Treatment and handling of municipal wastewater sludge is most problematic. Because of colloidal dispersion, it cannot be readily filtered or the solids otherwise mechanically separated without first substantially reducing the amount of water. To accomplish this, following aerobic or anaerobic digestion the wastewater is held in ponds or lagoons for evaporating water to concentrate the sludge solids. These large lagoons often cover a square mile or more. In addition to the land surface area requirements for such lagoons compounded by the objectionable odors in the surrounding vicinity, the disposal of the resulting condensed sludge solids presents additional problems. Moreover, quantities of municipal sewage sludge are rapidly accelerating due to population increases, especially in concentrated urban areas, thus pushing present disposal methods and sites beyond capacity.

A desirable method for disposing of wet sludge solids recovered from the evaporation process is to spread the material on agricultural land in an attempt to use its valuable fertilizing constituents. Unfortunately, because of increasing high concentrations of some heavy metals in the sludge from industrialized areas, this method poses severe environmental hazards. Such metals include lead, mercury, silver, arsenic, cadmium and chromium, all considered hazardous by federal and municipal governmental authorities. These metals as well as other toxic trace metals can result in metal toxicity to plants, and are particularly dangerous for consumable green leaf vegetables. Moreover, such undesirable constituents have now been found to contaminate aquifers and other water sources as the heavy metals are leached from the sludge under natural water run-off conditions which effect is even more pronounced with acid rain. Landfill and fertilizer applications also have the additional drawbacks of human acceptance, particularly due to the odor and potential problems caused by fecal coliform bacteria, pathogens, and the like. Normally, land sprayed with such sludge must also be controlled to human access for at least about twelve months. It is to the elimination of these problems as well as to produce a highly acceptable, clean and useful fertilizer and of recovering precious and heavy metals from wastewater sewage sludge that the present invention is directed.

SUMMARY OF THE INVENTION

The present invention is directed to an improved process for treating municipal wastewater and sewage sludge in a two-stage sulfur dioxide treatment. The process results in the recovery of fertilizer from the sludge solids with substantially all of the hazardous heavy metals removed and pathogens or other dangerous or objectionable bacteria or coliforms and odors eliminated. The process also provides for recovery of valuable noble and heavy metals as well as producing a dischargeable effluent water of such a low bacteria and pathogen content while substantially free from hazardous and objectionable metals and other elements that it meets established environmental criteria and can be emptied into rivers, lakes or other natural bodies of water without danger.

DETAILED DESCRIPTION OF THE INVENTION

Figure 1:
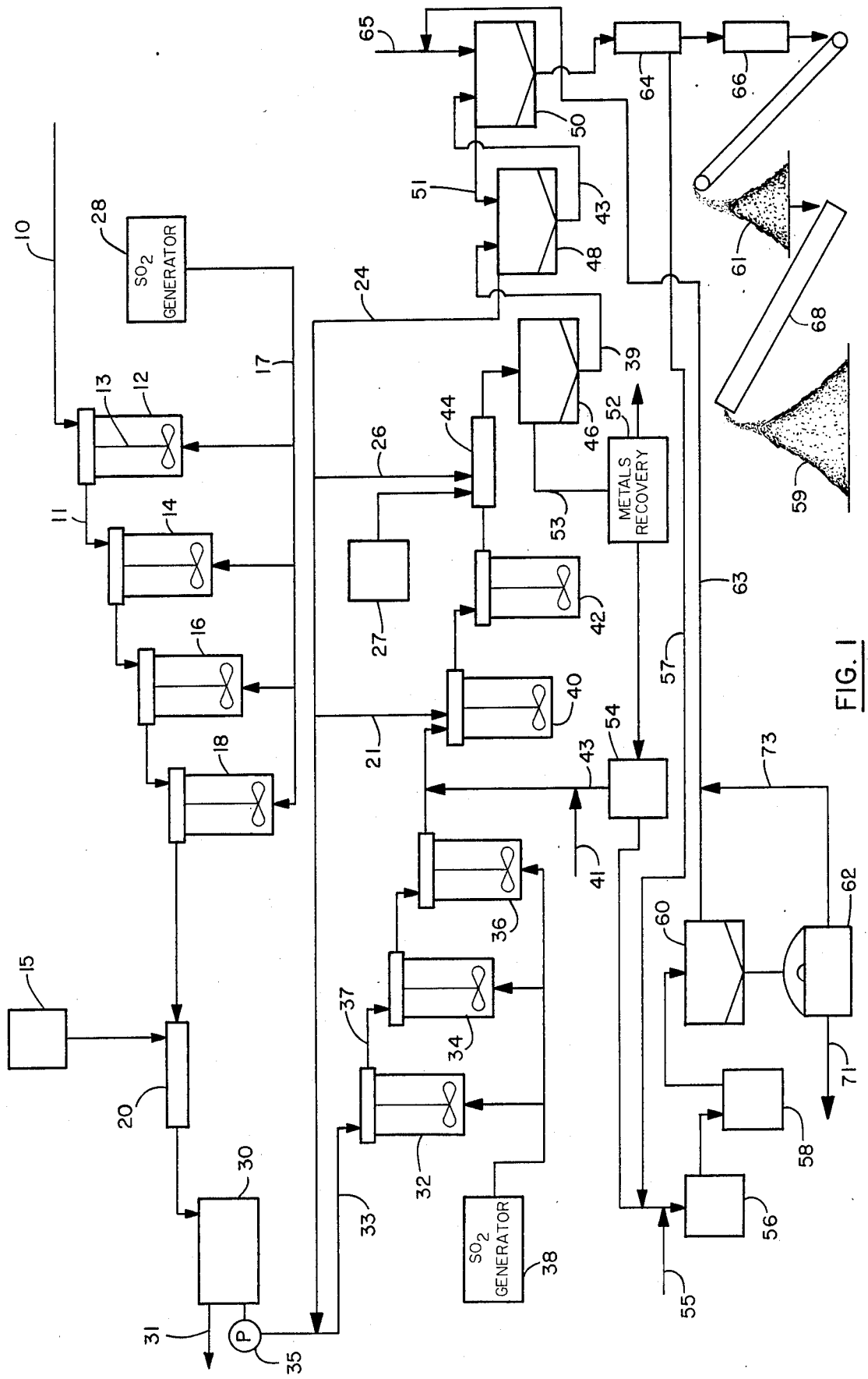
FIG. 1 is a schematic illustration of the equipment and process of the invention.
Figure 2:
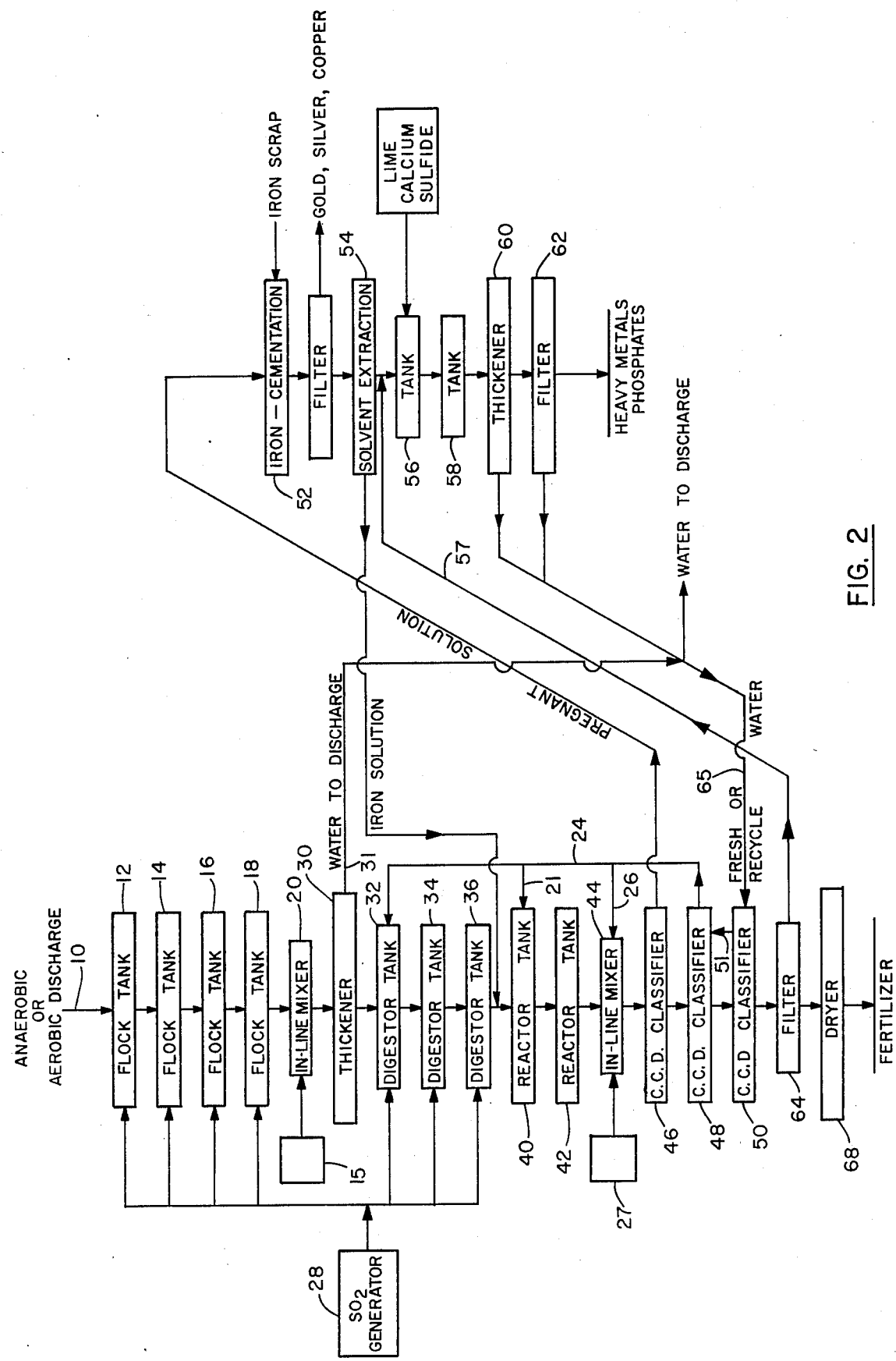
FIG. 2 is a flow diagram of the process.

In the first stage of the process, wastewater sludge from a municipal aerobic or anaerobic digestion process is introduced into the first sulfur dioxide reactors via pipe 10. This sludge which contains approximately 1-2% solids cannot be readily filtered or otherwise mechanically handled because of the small particle size and colloidal dispersion of the solids which prevents them from settling. In the preferred apparatus as schematically illustrated in the drawing, a plurality of reaction drums 12, 14, 16 and 18 are connected in series so that the sludge overflows from one vessel to the next through pipes 11. In a suitable apparatus, each reaction drum may be conveniently of a 5,000 gallon capacity and equipped with a stirring blade 13 for mixing the processing composition. In this first sulfur dioxide reaction phase, sulfur dioxide is directed into each of the reaction vessels via pipe 17 from generator 28 or other sulfur dioxide source. Sulfur dioxide may be generated by burning sulfur in the presence of sufficient oxygen so as to substantially oxidize all of the sulfur to sulfur dioxide by any conventional means. Alternatively, sulfur dioxide may be directed to the reaction vessels from any suitable source. The first sulfur dioxide reaction phase uses about 25 to about 35 pounds sulfur dioxide per ton of dry solids in the sludge. The amount of sulfur dioxide to be introduced can be readily calculated since the amount of solids present in the aerobic or anaerobic digestion sludge will be known. The reaction occurs readily with the stirring in the series reaction vessels. The total exposure time of the sludge in the first sulfur dioxide treatment phase of about 15 minutes will be sufficient. Longer reaction times caused by slower flow of the sludge material in the reaction may be used. However, the reaction time should not be less than about 10 minutes. Ambient reaction temperatures, of between about 10° and about 50° C. are suitable. Lower temperatures may require longer reaction times. In this first sulfur dioxide reaction phase, not all of the pathogens, bacteria, etc. are killed. Instead, it has been found that the bacteria or coliform kill is about 85-95% based on the percentage of fecal coliform bacteria remaining from the original concentration from the sludge introduced initially in the process. Moreover, the odor of the sludge material has been substantially eliminated. If desired, bacteria kill may be increased by increasing the sulfur dioxide concentration.

The initial sulfur dioxide treated sludge is then introduced into an inline mixer 20 or other suitable mixing vessel into which is added a flocculent for improving the efficiency of the initial separation of solids from the wastewater. Because of the positive charge placed on the sludge solids by the sulfur dioxide, the flocculent should be anionic. Preferred flocculents are polyacrylamide-type flocculents which are highly anionic and have molecular weights preferably above $10^7$ and more preferably above $1.2 \times 10^7$. The most preferred material is a flocculent having a molecular weight of $1.6-1.8 \times 10^7$ and available as Superfloc® 208 from American Cyanamid Company. Conveniently the flocculent is premixed to the desired concentration and metered from holding tank 15 at the rate of about 0.1–0.4 pounds per ton of dry solids with about 0.2 pounds normally being suitable. The mixed sludge and flocculent material is discharged into thickening tank 30. A suitable thickening tank is of the Delta-stack type although other thickener apparatus may be used including Dorr clarifiers of various designs, well known to those skilled in the art. In the thickening tank, a substantial amount of water is separated from the solids. Most of the water recovered from thickener tank 30 is discharged via pipe 31. The discharged water not only meets but exceeds all present environmental standards for pathogen, metal, toxic chemical or other standards, and is thus quite suitable for discharge into natural water bodies.

The solids recovered from thickening tank 30 are directed via conduit 33 to the second sulfur dioxide treatment stage using a solids pump 35 having a variable control drive. The solids composition recovered from the discharge tank is in the form of a thick, syrupy material of about 16% solids content. In the second sulfur dioxide treatment stage, a plurality of digestor tanks in series, similar to those used in the first treatment stage are conveniently used, again preferably being provided with stirring or other agitation means. However, the tanks in this second stage may be smaller since there will be a significantly smaller volume of material treated because of the substantial water removal at the thickening tank. In the drawing, a second sulfur dioxide generator 38 is shown, although conveniently the same generator may be used. Sulfur dioxide generator 38 directs sulfur dioxide gas to the plurality of digestor tanks 32, 34 and 36. These tanks are all provided with overflow pipes or conduits 37 so that in the continuous process, the treated sludge composition is directed from the first reaction tank successively to the other tanks. Although a single digestor reaction tank may be used, a plurality of successive tanks is preferred to enhance the sulfur dioxide and sludge exposure and reaction as well as to improve the rate at which the continuous process may be carried out.

In this second sulfur dioxide treatment stage, between about 300 and about 500 pounds of sulfur dioxide is introduced per ton of dry solids. The sludge is exposed to the sulfur dioxide for at least about one-half hour up to 1½–2 hours, depending on the composition temperature, until the pH of the reaction product is about 2.0 or less. The reaction mixture temperature may be ambient or may be heated at temperatures up to about 160° F. The reaction time is proportional to the temperature. This sulfur dioxide reaction and the resulting acidity is required to increase solubility of the metals present, particularly heavy hazardous metals as well as the noble metals. For example, it has been found that a pH of 2.0, and preferably 1.5 and more preferably 1.0 yield substantially improved lead, chromium, zinc and silver solubility. In this second reaction stage, the flocculent added previously in the process is broken down and does not otherwise interfere with the remainder of the process nor the materials recovered.

Following the second sulfur dioxide treatment, phosphates may be removed, or they may be allowed to remain in the solution and precipitated later with the heavy metals at filter 62. If significant amounts of phosphates are contained in the sludge it may be preferred to remove them by precipitation as iron hypophosphate at this stage of the process. For this purpose, the reaction product from the second sulfur dioxide sludge reaction is withdrawn from the last digestor tank 36 to reactor tanks 40 and 42 into which iron in the form of ferric chloride, ferric sulfate or other soluble iron salt is introduced. Ferric chloride will be directed to the reactor tanks from the solvent extraction tank 54 via conduit 43 although it may be introduced separately or supplemented from another iron source via line 41. The amount of iron added should be between about 30–50 lbs. of ferric chloride per ton of dry solids, or an equivalent amount of ferric sulfate. The reaction mixture is preferably heated to between about 150°–160° F. at a pH of about 1 with a total reaction time of about 15 to 30 minutes being suitable. If phosphate content of the sludge is low, for example below about 1%, this reaction step may be eliminated.

The sludge reaction mixture is then directed through a second inline mixer 44 into which is introduced a flocculent such as a high molecular weight polymer as previously disclosed. Although an anionic flocculent such as Superfloc ® 208 may be used, at this stage of the process a preferred material is a cationic polymer, for example, Hydrofloc 661 sold by Aqua Ben Corporation. Such materials are conveniently metered from a pre-mix tank 27. The discharge from inline mixer 44 is then directed to a decantation circuit for physically separating the remaining sludge solids from the liquor containing the dissolved metal salts. A preferred decantation apparatus comprises a countercurrent decantation means for thickening the remaining sludge solids. A conventional continuous countercurrent decantation apparatus well known to those skilled in the art and schematically illustrated in the drawing is preferred. Such an apparatus includes a series of trays or vessels 46, 48 and 50 in which solids are successively directed via conduits 39 and 43 in a countercurrent direction to the wash solution whereby the solids become progressively impoverished in soluble-salt content by coming in contact with progressively weaker wash solutions. Accordingly, the solids from the first tray 46 are directed to second tray 48 via conduit 39 and to the third tray 50 via conduit 43. The countercurrent solutions are drawn between the trays by over flow along pipes 51 and 24, respectively, as shown. Thus, the wash liquor from tray 50 is directed into adjacent tray 48. These impoverished wash solutions are then used as make-up solution in reactor tank 40 via conduits 24 and 21, or as initial solution in tank 32 via conduits 24 and 33. This impoverished solution may also be used as a diluent in inline mixer 44 via conduit 26. Fresh wash water may be introduced into the final tray 50 via pipe 65 if desired. The important feature of the countercurrent decantation circuit is to wash enough of soluble metal salts from the solids to pass the EPA toxicity test as described in Section 3001 of the Resource Conservation and Recovery Act (RCRA), May 1980, Appendix 2, pages 33127–33128; Federal Register, vol. 45, No. 98. The thickened solids are directed to filter apparatus 64, where they may be filtered and washed again, and to pug mill 66. From the pug mill the blended solids are directed to a cure pile 61, to a final dryer 68 and fertilizer stack 59. The filtrate from filter 64 is exceedingly impoverished in metal and phosphate salts and will likely not be clean enough for discharge. Accordingly, it is preferably directed to neutralization tanks 56 and 58 via conduit 57.

If metals recovery is not important, the liquor from the decantation may be discarded. The liquor may be neutralized, if desired, prior to being discarded to meet environmental requirements. If it is desirable to recover metals from the aqueous liquor from the decantation process phase, the most concentrated aqueous liquor is recovered from first tray 46 and directed to metal recovery process stage 52 via conduit 53. The metals recovery may be carried out by any conventional or state of the art methods not a part of the present invention. In this stage the pregnant solution is exposed to scrap iron, iron powder, steel wool, etc., to precipitate all metals below iron in the electromotive series including tin, lead, copper, mercury, silver, platinum, gold, antimony, cadmium and bismuth. The filtered metals may then be separated and refined. The remaining liquid is then directed to a solvent extraction vessel 54 to recover iron salts. Most of the iron salts will be in the form of ferrous salts, primarily ferrous chloride from the reduction reaction with iron. The ferrous salts may be used again in the process circuit in reactor tanks 40 and 42 via conduit 43. However, it may be preferred to oxidize the ferrous salts by passing oxygen containing gas (air) through the solution prior to the solvent extraction step.

The solvent extraction solution is then directed to neutralization tanks 56 and 58 where it is mixed with lime and calcium sulfide added through line 55 to a pH of about 7. The resulting slurry is then discharged to thickener tray 60 to separate solids from liquid, the solids being filtered and washed in filter 62 and recovered via 71. The metals recovered at this stage include chromium, cobalt, nickel, gallium, germanium, strontium, and aluminum. If phosphates have not been separated using iron salts as previously discussed, they will precipitate here with the metals. The phosphates and heavy metals may be separated for recycle or sale, or the phosphates may be blended back into the fertilizer in pug mill 66. The liquid recovered from the thickener and filter may be returned to the countercurrent decantation phase via lines 63 and 73, or be discharged.

The process of the invention results in an outstanding fertilizer product which may be used on green leaf vegetables and with extremely low, if not eliminated, levels of toxic and heavy metals. Such a fertilizer contains desirable concentrations of phosphorus as $P_2O_5$, nitrogen, sulfur, potassium and calcium as well as high humic acid extract concentrations. Moreover, the fertilizer is substantially free of pathogens including coliform bacteria. At the same time, the process produces water that is suitable for discharge into natural bodies of water. A further substantial advantage is the recovery of noble metals and other valuable heavy metals, particularly gold, silver, gallium and germanium. Although the drawing illustrates most preferred means for carrying out the process, other equivalent apparatus for achieving the same results may be utilized as will be understood by those skilled in the art within the purview of the invention.

I claim:

1. A process for treating municipal wastewater sludge from anaerobic or aerobic digestion comprising
   (a) placing said sludge into a reaction vessel and introducing between about 25 and about 40 pounds $SO_2$ per ton of dry solids into said sludge with agitation,
   (b) withdrawing the $SO_2$ treated sludge from the reaction vessel and mixing between about 0.1 and about 0.5 pounds per ton of dry solids of a flocculent having a molecular weight of at least about $10^7$ with said treated sludge,
   (c) placing the mixture from step (b) in a clarifier and separating the solid sludge from the water phase,
   (d) directing the solid sludge to a vessel and introducing between about 300 and 500 pounds $SO_2$ per ton of dry solids with agitation until the pH of said sludge is no greater than about 2.0,
   (e) directing the reaction product mixture of step (d) to a thickener apparatus and separating the aqueous liquor from the solids, and
   (f) recovering the solids from step (e).

2. A process of claim 1 including the steps of recovering the aqueous liquor from step (e) and treating said liquor to recover one or more metal constituents thereof.

3. A process of claim 2 including recovering the liquor from the metal recovery step, neutralizing the recovered liquor to a pH of about 7 to precipitate metal salts therefrom.

4. A process of claim 1 wherein the separation of aqueous liquor from solids in step (e) comprises continuous countercurrent decantation.

5. A process for treating anaerobic or aerobic sewage sludge comprising
   (a) treating said sludge with between about 25 and about 40 pounds sulfur dioxide per ton of dry sludge solids to form a first sludge reaction product,
   (b) adding between about 0.1 and about 0.5 pounds of anionic flocculent to said first sludge reaction product and separating the resulting solid and liquid phases,
   (c) treating the solid phase recovered from (b) with between about 300 and about 500 pounds sulfur dioxide per ton of dry sludge solids to form a second sludge reaction product,
   (d) separating the solid and liquid phases of said second sludge reaction product, and recovering the second sludge reaction product solids.

6. A process of claim 5 wherein the second sludge reaction product has a pH of between about 1 and 2 including the additional step of recovering the liquid phase thereof and treating the liquid to recover metals therefrom.

7. The process of claim 6 including recovering the liquor from the liquid phase following metal recovery, neutralizing the liquor to a pH of about 7, and recovering metal salts from said composition.

8. The process of claim 7 including directing the liquor of said composition following said metal salt recovery to said step of separating the solid and liquid phase of said second sludge reaction product.

9. The process of claim 5 wherein the solid and liquid phases of the second sludge reaction product are separated by continuous countercurrent decantation.

10. The process of claim 9 wherein the anionic flocculent comprises a polyacrylamide having a molecular weight of at least about $10^7$.

11. The process of claim 5 including the step of mixing ferric chloride with the second sludge reaction product of step (c) prior to step (d).

12. The process of claim 11 including adding a high molecular weight flocculent to the ferric chloride, second sludge reaction product prior to step (d).

13. The process of claim 12 wherein said high molecular weight flocculent is cationic.

* * * * *